United States Patent [19]

Allen

[11] 3,976,210

[45] Aug. 24, 1976

[54] ANTI-TIPPING LOG SKIDDER

[75] Inventor: Jan K. Allen, Chillicothe, Ill.

[73] Assignee: Caterpillar Tractor Co., Peoria, Ill.

[22] Filed: Apr. 23, 1975

[21] Appl. No.: 570,984

Related U.S. Application Data

[62] Division of Ser. No. 352,360, April 18, 1973, Pat. No. 3,899,093.

[52] U.S. Cl............................. 214/85.5; 254/193
[51] Int. Cl.² ............................................. B60P 1/52
[58] Field of Search................... 214/85.5, 92, 523; 254/166, 139.1, 193, 190 R, 194, 195, 196

[56] References Cited
UNITED STATES PATENTS

| | | | |
|---|---|---|---|
| 2,201,904 | 5/1940 | Lallier............................. | 254/193 X |
| 3,022,908 | 2/1962 | Arnold................................ | 214/92 |
| 3,049,186 | 8/1962 | Garrett.......................... | 214/85.5 X |
| 3,417,889 | 12/1968 | Anthony......................... | 214/85.5 X |
| 3,498,488 | 3/1970 | Wildey et al...................... | 214/85.5 |

Primary Examiner—Albert J. Makay
Attorney, Agent, or Firm—Phillips, Moore, Weissenberger, Lempio & Strabala

[57] ABSTRACT

A log skidder has a pair of upper and lower rollers mounted rearwardly of a towing winch to receive a cable therefrom. In normal operation, the cable is solely guided over the upper roller whereas during the ascent of a steep grade, for example, the cable is further received under the lower roller to substantially decrease the tipping moment arm imposed on the log skidder.

6 Claims, 6 Drawing Figures

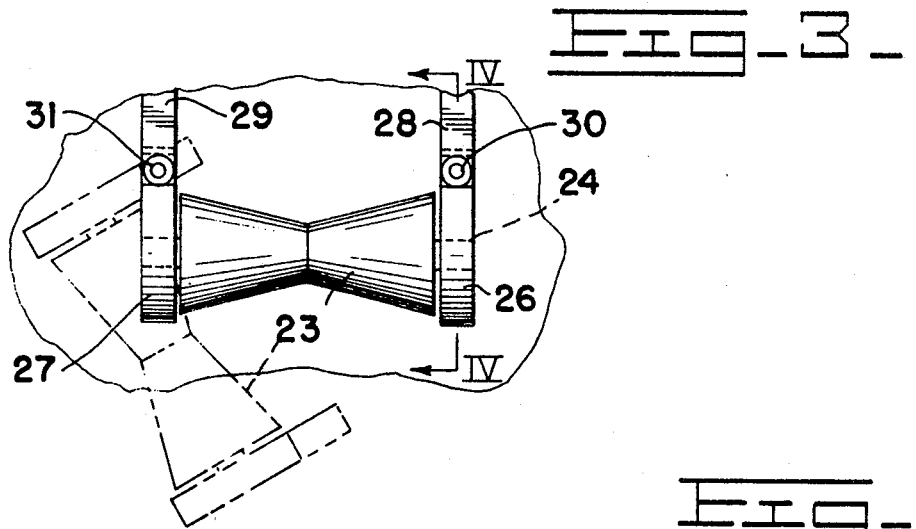
Fig_3_
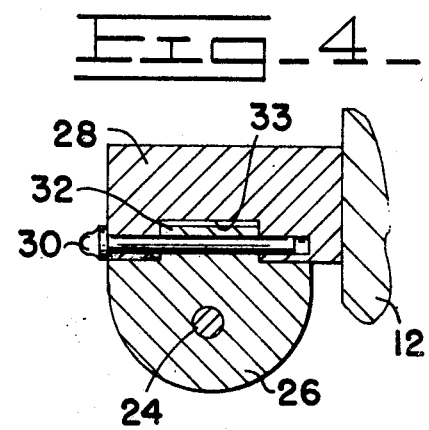
Fig_4_
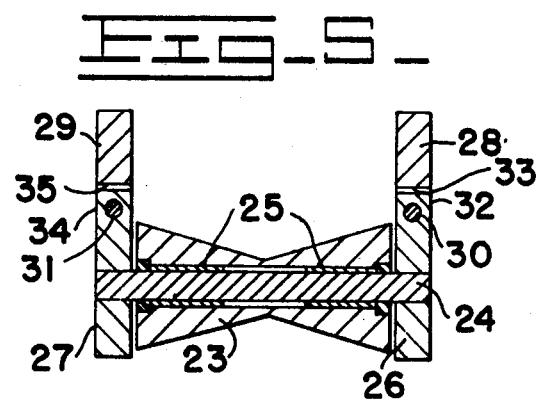
Fig_5_
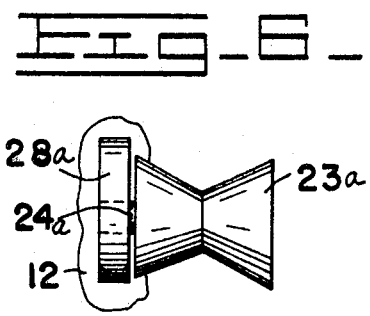
Fig_6_

ANTI-TIPPING LOG SKIDDER

This is a division of Ser. No. 352,360, filed Apr. 18, 1973, now Pat. No. 3,899,093.

BACKGROUND OF THE INVENTION

A conventional log skidder is adapted to skid felled logs to a decking area for subsequent transport to a sawmill or the like. During such a logging operation, the cable of a towing winch is normally attached to a log to draw the log into a raised position, closely adjacent to the log skidder. Although such a procedure is normally desirable, a substantially large tipping moment arm is imposed on the log skidder when the log is skidded up a steep grade, for example. Such tipping moment arm is occasioned by the disposition of a cable-guiding fair-lead guide roller, substantially high on the log skidder. A tipping-over of the log skidder would not only cause damage thereto, but would also subject the operator to bodily harm.

SUMMARY OF THIS INVENTION

An object of this invention is to overcome the above, briefly described problems by providing a log skidder with a second cable guide means for substantially shortening the tipping moment arm during selected phases of log skidder operation. The log skidder comprises a frame having a towing winch mounted thereon to selectively pay-out a cable therefrom for attachment to a log. A first cable guide means is mounted on and vertically above the frame, rearwardly of the towing winch, whereas a second cable guide means is mounted on the frame substantially below the first guide means. The second cable guide means is constructed to selectively receive the cable thereunder from the first guide means to substantially shorten the tipping moment arm of the log skidder.

BRIEF DESCRIPTION OF THE DRAWINGS

Further objects of this invention will become apparent from the following description and accompanying drawings wherein;

FIG. 3 is a rear elevational view of the second cable guide means, taken in the direction of arrows III—III in FIG. 2;

FIG. 4 is a sectional view of the second cable guide means, taken in the direction of arrows IV—IV in FIG. 3;

FIG. 5 is a view similar to FIG. 3, but showing the second cable guide means in cross-section; and FIG. 6 is a view similar to FIG. 3, but illustrating a modification of the second cable guide means.

DETAILED DESCRIPTION

Figure 1:
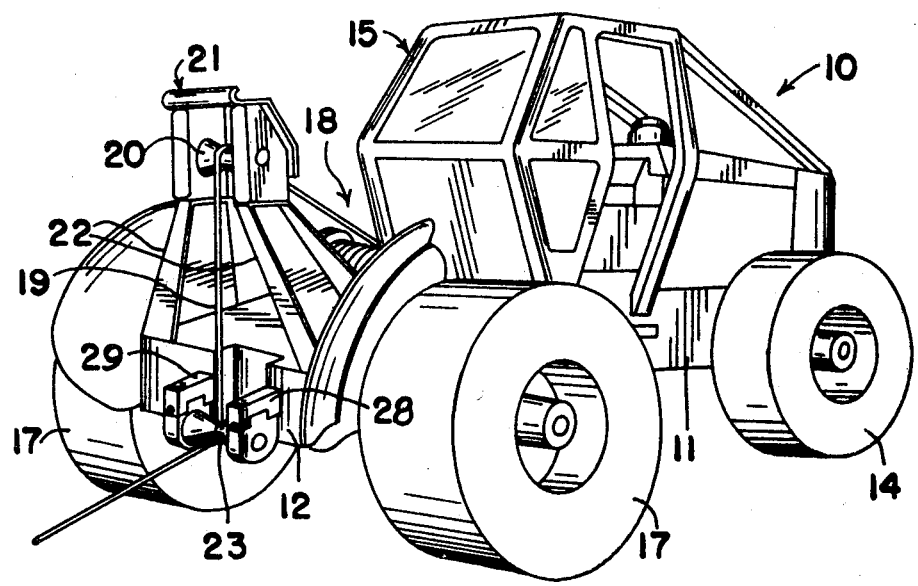
FIG. 1 is an isometric view of a log skidder having a towing winch and attendant first and second cable guide means mounted on a rearward end thereof.
Figure 2:
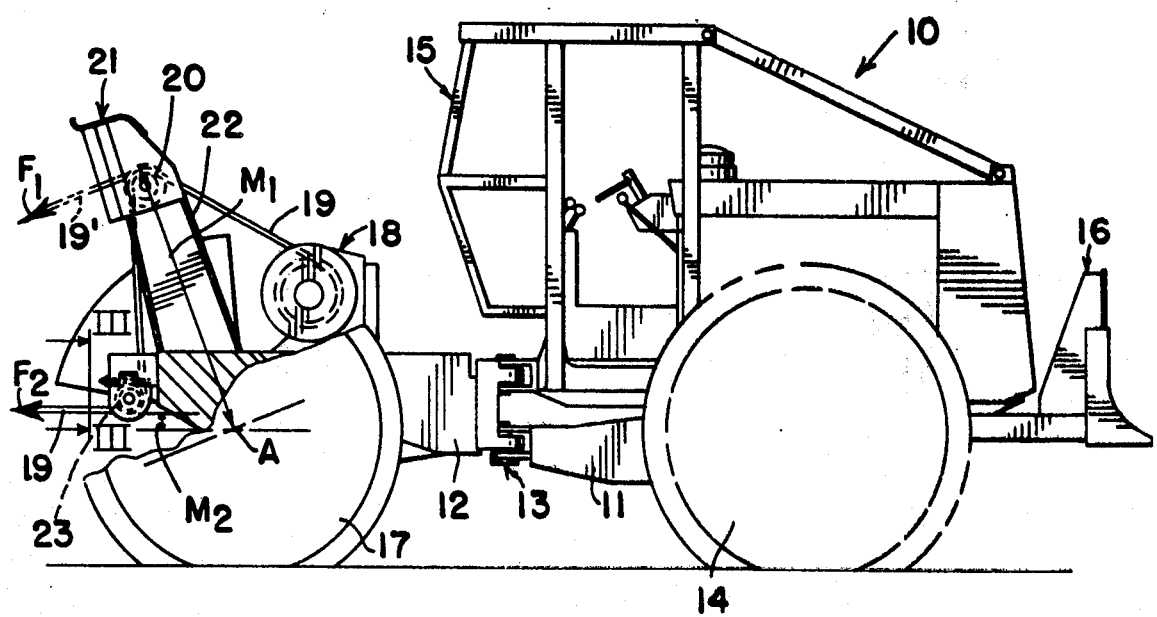
FIG. 2 is a partially sectioned, side elevational view of the log skidder.

FIGS. 1 and 2 illustrate a log skidder 10 comprising articulated front and rear frame sections 11 and 12 pivotally connected together by vertically disposed hinge pin means 13. Suitable actuators (not shown) are operatively connected between the front and rear frame section to control the relative pivotal movement thereof for steering purposes. The front frame section is mounted on a pair of transversely disposed wheels 14 (one shown) and has an operator's cab 15 and a bulldozer 16 mounted thereon.

The rear frame is mounted for movement on a pair of wheels 17 and mounts a towing winch 18 thereon. The towing winch has a cable 19 wrapped thereon, adapted to be selectively paid-out and paid-in under control of the operator by suitable control means (not shown) mounted in cab 15. A first cable guide means comprises a guide roller 20 rotatably mounted in a box-like fairlead 21, secured on the upper ends of a pair of support brackets 22 of a logging frame. The support brackets are secured at their lower ends to rear frame section 12 to thus position the first cable guide means vertically thereabove and rearwardly of the towing winch to receive and guide cable 19 thereon.

A second cable guide means comprises a roller 23 rotatably mounted on rear frame section 12 in at least general vertical alignment substantially below and preferably slightly rearwardly of roller 20. Referring to FIGS. 3–5, roller 23 is rotatably mounted on a shaft 24 by sleeve bearings 25, FIG. 5, and the ends of the shaft are secured to laterally spaced first and second brackets 26 and 27. The brackets are attached to support brackets 28 and 29, secured to frame section 12, by releasable fastening means, such as pins 30 and 31, aligned with the longitudinal axis of the log skidder.

As more clearly shown in FIG. 4, bracket 26 has a rectangularly shaped lug 32 which engages a like-shaped slot 33 of bracket 28 to form a key and slot connection thereat. Likewise, bracket 27 has a lug 34 formed thereon which engages a like-shaped slot 35 formed on bracket 29. Such key and slot connections fully accommodate downward swinging movement of roller 23, about pin 31 upon removal of pin 30, as indicated by the phantom-line position of the roller in FIG. 3.

FIG. 6 illustrates a modification of the second cable guide means wherein a roller 23a is rotatably mounted on a bracket 28a, secured to rear frame section 12 by a shaft 24a. Since the roller is constructed to have one side thereof open, cable 19 can be selectively placed thereunder during selected phases of log skidder operation.

Referring again to FIG. 2, normal operation of the log skidder over even terrain would normally require the use of only roller 20 to guide and maintain the cable in its phantom-line position 19'. Such disposition will give rise to a substantially long tipping moment arm $M_1$, between roller 20 and the rotational axis A of wheels 17. Should the log skidder attempt to pull the log up a steep grade, moment arm $M_1$ would tend to tip the log skidder over backwardly.

In order to eliminate such a possibility, the operator would merely stop the vehicle and release and subsequently replace pin 30 to position the slacked cable transversely under roller 23. In the FIG. 6 embodiment, the cable need only be slipped transversely under the free, cantilevered end of roller 23a. The relocation of the cable under the second cable guide means will thus impose a substantially shorter tipping moment arm $M_2$ on the log skidder (FIG. 2) and will lower the composite center of gravity thereof to eliminate the possibility of vehicle tipping.

What is claimed is:

1. A log skidder disposed on a longitudinal axis thereof comprising a frame, a towing winch mounted on said frame and having a cable wrapped thereon, first cable guide means mounted on and vertically above said frame and positioned rearwardly of said towing winch, said cable received and guided over said first cable guide means, and second cable guide means mounted on a lowermost portion of said frame substantially below and in fixed relationship relative to said first guide means and constructed to define an opening for selectively permitting said cable to be placed thereunder from said first guide means to substantially shorten the tipping moment arm of said log skidder during selected phases of operation thereof, said second cable guide means constituting a roller rotatably mounted at only one end thereof in cantilevered relationship on said frame whereby said cable may be selectively moved transversely under an opposite free end of said roller.

2. The log skidder of claim 1 further comprising a bulldozer assembly mounted on a forward end thereof.

3. The log skidder of claim 1 wherein said frame comprises front and rear frames connected together by a vertically disposed pivot means, said towing winch mounted on said rear frame.

4. The log skidder of claim 1 wherein said first cable guide means comprises a roller rotatably mounted on a logging frame secured on the frame of said log skidder.

5. The log skidder of claim 4 wherein the roller of said first cable guide means is rotatably mounted on a box-like fairlead, secured on said logging frame to confine said cable therein.

6. The log skidder of claim 1 wherein said second cable guide means is disposed in at least approximate vertical alignment, below said first cable guide means.

* * * * *